United States Patent [19]
Brinkley et al.

[11] 3,730,510
[45] May 1, 1973

[54] LOCKING DEVICE FOR THE CLAMPS OF A TUBE SPLICER

[75] Inventors: Max D. Brinkley, North Canton; Glenn D. Kerr, Akron, both of Ohio

[73] Assignee: The Goodyear Tire & Rubber Company, Akron, Ohio

[22] Filed: Nov. 29, 1971

[21] Appl. No.: 202,907

[52] U.S. Cl. ..................................269/25, 269/90
[51] Int. Cl. ...............................................B23g 3/06
[58] Field of Search ..........................269/25, 90, 228, 269/229, 230

[56] References Cited
UNITED STATES PATENTS

| | | | |
|---|---|---|---|
| 2,422,114 | 6/1947 | Matter | 269/230 |
| 2,914,977 | 12/1959 | Verderler | 269/25 |

*Primary Examiner*—Granville Y. Custer, Jr.
*Attorney*—F. W. Brunner et al.

[57] ABSTRACT

A machine having a pair of clamps for holding opposing ends of an innertube firmly in position for cutting and subsequent movement into compressive, splicing engagement. Each clamp has a movable jaw cantilevered over a fixed jaw and a latching mechanism for locking the jaws together to eliminate any movement of the clamps, especially the free cantilevered ends of the movable jaws.

15 Claims, 2 Drawing Figures

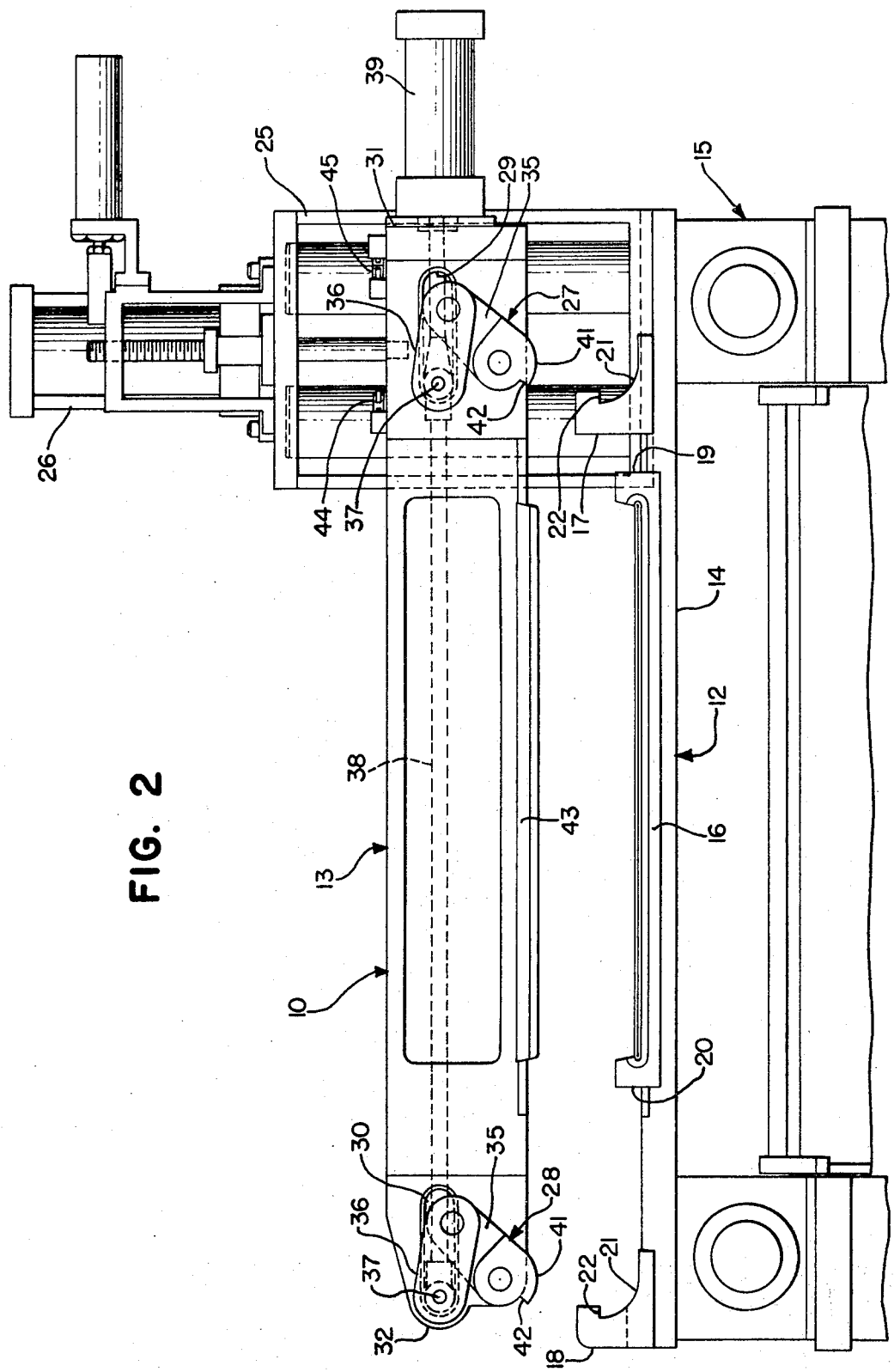

LOCKING DEVICE FOR THE CLAMPS OF A TUBE SPLICER

BACKGROUND OF INVENTION

The invention is particularly well suited for use in a machine for splicing rubber innertubes, especially the machines shown and described in copending application Ser. No. 14,100, filed Feb. 25, 1970 now U.S. Pat. No. 3,623,932. Such machines employ a pair of clamps for holding the free ends of an innertube in aligned relation for cutting by heated knives. The clamps are immediately moved towards each other to bring the freshly cut tube ends into compressive splicing engagement.

Each of the clamps is similar in design and comprises a fixed jaw which is rigidly supported on a flat bed or table, and a movable jaw which is cantilevered over the fixed jaw. Each of the jaws is designed for receiving and holding an end of the innertube. A great deal of pressure is exerted on the tube ends by the clamp jaws. This is necessary to maintain the tube ends firmly in position during the cutting and squeezing operations. The free cantilevered ends of the movable jaws are highly susceptible to movement, which is undesirable, since any movement of the clamp jaws, especially when squeezing the tube ends together, can cause a defective splice. The invention is directed to providing a device for solving this particular problem.

SUMMARY OF THE INVENTION

Briefly stated, the invention is in a clamp for holding a work piece. The clamp includes a first clamp jaw cantilevered over a second clamp jaw. Means are provided for causing relative movement of the clamp jaws to vary the spacing between them. A pair of spaced latches are carried by the first clamp jaw for interlocking latching engagement with a pair of correspondingly spaced stops associated with the second clamp jaw. Means are supplied for moving the latches into interlocking engagement with the stops in response to closure of the clamp where the first and second clamp jaws are in closest juxtaposed relation.

DESCRIPTION OF THE DRAWING

The following description of the invention will be better understood by having reference to the annexed drawing, wherein:

FIG. 2 is also a side view of the clamp showing the clamp jaws in an unlocked position.

DESCRIPTION OF THE INVENTION

Figure 1:
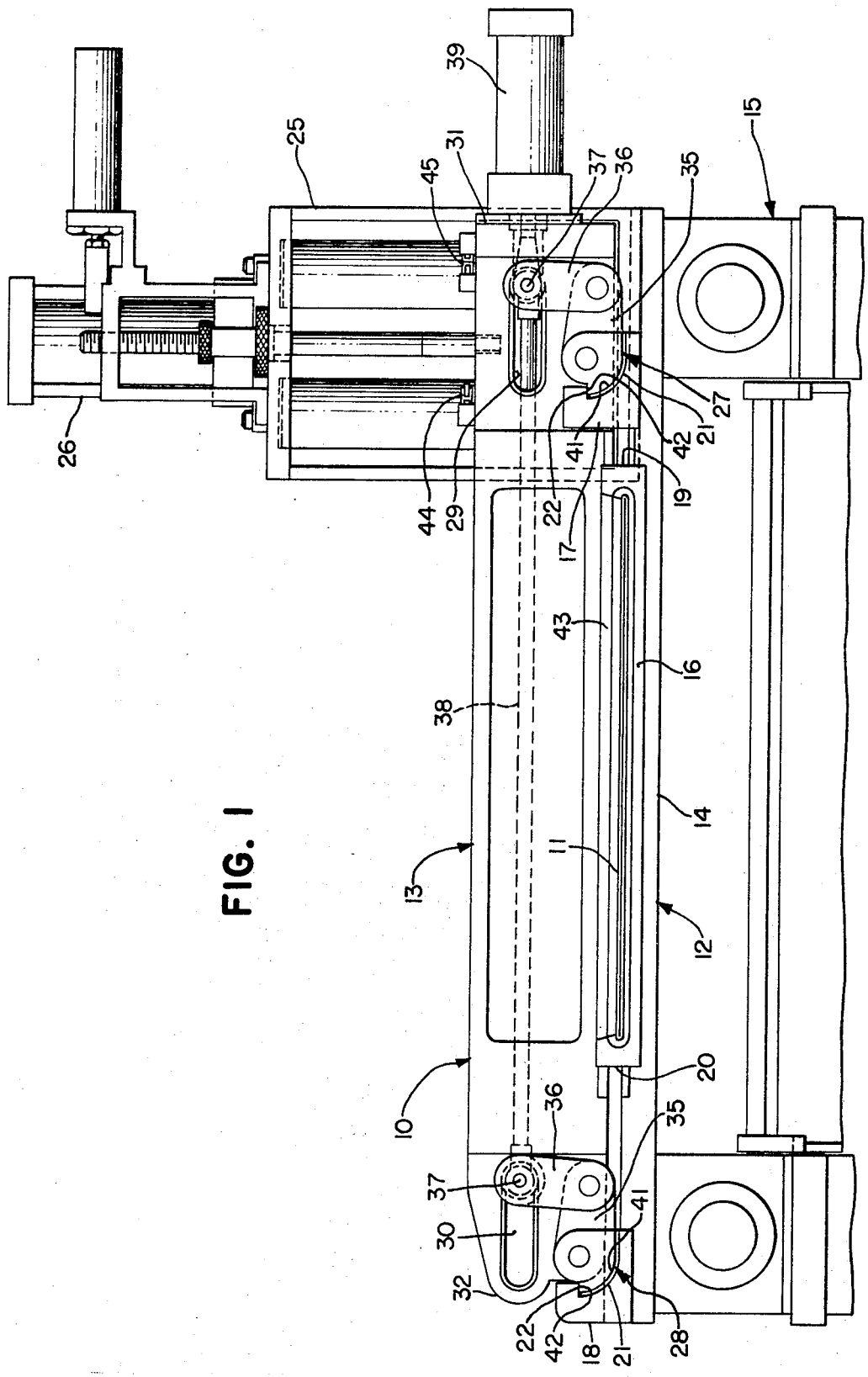
FIG. 1 is a side view of a clamp employing a latching mechanism made in accordance with the invention, the jaws of the clamp being shown in an interlocked position.

Referring generally to the drawing, there is shown a clamp 10 used for holding one of a pair of opposing ends of an innertube 11 during cutting of the tube ends and subsequent movement of the freshly cut tube ends into compressive, splicing engagement. An identical clamp is used for holding the other end of the innertube 11. Both clamps are similar in design and operation. Therefore, their description will be in relation to the clamp 10 shown in the drawing.

The clamp 10 comprises a pair of jaws 12 and 13 which are movable relative to each other for varying the spacing between them. The lower jaw 12 is rigidly secured to a flat bed 14 of a tube splicer 15. In this case, the lower fixed jaw 12 is integral with the flat bed or squeeze table 14, and comprises a bottom clamp section 16 rigidly secured to the squeeze table 14 for receiving one end of the intertube 11.

A pair of stops 17 and 18 are securely fastened on the fixed clamp jaw 12, or table top 14 adjacent opposing ends 19 and 20 of the bottom clamp section 16. Each of the stops 17 and 18 extends upwardly from the table top 14 and includes a curved surface 21 terminating in an abutment 22 which is preferably a flat surface disposed in a plane parallel to the table top 14 and normal to the direction of relative movement of the clamp jaws 12 and 13.

A rigid turret or guide 25 extends upwardly from the table top 14. The upper clamp jaw 13 is slidably mounted on the turret 25 for movement towards and away from the fixed clamp jaw 12. A conventional air cylinder 26 is coupled between the turret 25 and upper movable clamp jaw 13 and used for reciprocating the movable clamp jaw 13 along the longitudinal axis of the turret 25.

A pair of spaced latches 27 and 28 are carried by the movable clamp jaw 13 for interlocking engagement wit the stops 17 and 18 extending from the fixed clamp jaw 12. A pair of elongated slots 29 and 30 are disposed in opposing ends 31 and 32 of the movable clamp jaw 13. The longitudinal axes of he slots 29 and 30 are preferably aligned and parallel to the longitudinal axis of the movable clamp jaw 13.

The latches 27 and 28 comprise similarly configured pivot arms 35 which are mounted for rotation in planes parallel to the plane of the clamp jaws 12 and 13 and about axes which are normal to the direction in which the movable clamp jaw 13 moves towards and away from the fixed clamp jaw 12. The pivot arms 35 are coupled to links 36 which are, in turn, pivotally mounted on pins 37 slidable in the slots 29 and 30. The pins 37 are connected for unitary movement by a rod 38 extending longitudinally of the upper clamp jaw 13. An air cylinder 39 is coupled to the nearest pin 37 for reciprocating the pins 37, in unison, in the slots 29 and 30. The links 36 are coupled between the pins 37 and pivot arms 35, such that they translate axial movement of the pins 37 into rotary movement of the pivot arms 35, i.e. the links 36 rotate the pivot arms 35 into and out of interlocking engagement with the stops 17 and 18 when the pins 37 move to extreme positions in the slots 29 and 30 where the pins 37 are closest to, and farthest from, the air cylinder 39 for operating the latches 27 and 28.

The pivot arms 35 each have a free end 41 which, when the latches 27 and 28 are fully interlocked with the stops 17 and 18 (FIG. 1), matingly conforms to the curvature 21 in the stops 17 and 18. The outer curved end 41 of each pivot arm 35 terminates in a lug 42 which is preferably a flat surface for contacting the abutment 22 of an adjacent stop.

The movable clamp jaw 13 carries a top clamp section 43 which engages and compresses the innertube end against the bottom clamp section 16. The movable clamp jaw 13, in its lowermost position closest the fixed clamp jaw 12, engages any suitable mechanism, e.g. switch 44, for actuating operation of the air cylinder 39 to move the pins 37 from their rest positions nearest the free cantilevered end 32 of the movable clamp jaw 13, to their fully extended positions closest the air cylinder 39, thereby causing rotation of the pivot arms 35 into interlocking and over center latching engagement with the upstanding stops 17 and 18, whereby the movable clamp jaw 13 is locked firmly against the fixed clamp jaw 12 to eliminate movement of the tube ends during the cutting and squeezing operations. After the clamps 10 hold the tube ends in splicing engagement for a sufficient length of time, another switch 45 is activated to deactuate operation of the air cylinder 39 and return the pins 37 to their normal rest positions where the pivot arms 35 are disengaged from the stops 17 and 18 (FIG. 2). The movable clamp jaw 13 is then returned to its rest position in farthest spaced relation fro the fixed clamps jaw 13.

Thus, there has been described a device for locking a pair of clamps such that movement of any one of the clamping members is inconsequential and will not be detrimental to any work being done on the material or work piece being held by the clamps.

What is claimed is:

1. A machine for splicing innertubes comprising a pair of clamps for holding opposing ends of an innertube in aligned, spaced relation while the tube ends are cut and while the freshly cut tube ends are brought together in compressive splicing engagement, each pair of clamps including:
   a. a pair of jaws in juxtaposed relation;
   b. means for rigidly maintaining opposing ends of at least one jaw in planar relation;
   c. means for causing relative movement of the clamp jaws to vary the spacing therebetween, whereby the clamp is opened and closed;
   d. a pair of spaced stops associated with one of the pair of jaws, a stop being disposed on either side of an innertube held by the clamp;
   e. a pair of spaced latches carried by the other of the pair of jaws for latching engagement with the stops; and
   f. means, responsive to closure of the clamp where the jaws are closest, for moving the latches into interlocking relation wit the stops, such that the jaws are locked together.

2. The machine of claim 1, wherein each stop includes:
   g. an abutment in a plane normal to the direction of relative movement of the jaws.

3. The machine of claim 2, wherein each latch includes:
   h. a pivot arm;
   i. means for mounting the pivot arm for rotation in the plane of the jaws and about an axis normal to the direction of relative movement of the jaws; and
   j. a lug carried by the pivot arm for engaging the abutment when the pivot arm is rotated into latching engagement with an adjacent stop.

4. The machine of claim 3, wherein the means for moving the latches includes:
   k. a pair of axially aligned slots disposed in spaced relation in the jaw carrying the latches;
   l. a pin slidable in each slot;
   m. means connecting the pins for unitary movement;
   n. a link coupled between each pin and pivot arm for rotating the pivot arms, in unison; and
   o. means for moving the pins in a direction necessary for rotating the links in a direction which causes subsequent rotation of the pivot arms into interlocking over center latching engagement with the stops, when the jaws are closest.

5. The machine of claim 4, which includes:
   p. means for cantilevering the jaw carrying the latches, over the jaw with which the stops are associated.

6. The machine of claim 5, wherein the means for causing relative movement of the jaws includes:
   q. means for mounting the jaw carrying the latches, for movement towards and away from the other jaw which is in a fixed plane relative to the direction in which the jaw carrying the latches, moves.

7. The machine of claim 5, wherein the means (b) and (c) include:
   r. means for mounting the jaw, associated with he stops, in fixed planar relation to the direction of relative movement of the jaws;
   s. a turret extending upwardly from the jaw associated with the stops, the longitudinal axes of said jaw and turret being at right angles;
   t. means for slidably mounting the jaw, carrying the latches, in cantilevered relation from the turret, the longitudinal axes of said jaw and turret being at right angles; and
   u. means for reciprocating the jaw, carrying the latches, along the longitudinal axis of the turret to open and close the clamp.

8. The machine of claim 7, wherein the abutments and tops have mating contacting surfaces.

9. A clamp for holding a work piece, comprising:
   a. a pair of jaws in juxtaposed relation;
   b. means for rigidly maintaining opposing ends of at least one jaw in planar relation;
   c. means for causing relative movement of the jaws to vary the spacing therebetween, whereby the clamp is opened and closed;
   d. a pair of spaced stops associated with one of the pair of jaws, a stop being disposed on either side of a work piece held by the clamp;
   e. a pair of spaced latches carried by the other of the pair of jaws for latching engagement with the stops; and
   f. means, responsive to closure of the clamp where he jaws are closest, for moving the latches into interlocking relation with the stops, such that the jaws are firmly locked together.

10. The clamp of claim 9, wherein each stop includes:
    g. an abutment in a plane normal to the direction of relative movement of the jaws.

11. The clamp of claim 10, wherein each latch includes:
    h. a pivot arm;
    i. means for mounting the pivot arm for rotation in the plane of the jaws and about an axis normal to the direction of relative movement of the clamp arms; and
    j. a lug carried by the pivot arm for engaging the abutment when the pivot arm is rotated into latching engagement with an adjacent stop.

12. The clamp of claim 11, wherein the means for moving the latches includes:
k. a pair of axially aligned slots disposed in spaced relation in the jaw carrying the latches;
l. a pin slidable in each slot;
m. means connecting the pins for unitary movement;
n. a link coupled between each pin and pivot arm for rotating the pivot arms, in unison; and
o. means for moving the pins in a direction necessary for rotating the links in a direction which causes subsequent rotation of the pivot arms into interlocking over center latching engagement with the stops when the jaws are closest.

13. The clamp of claim 12, which includes:
p. means for cantilevering the jaw carrying the latches, over the jaw with which the stops are associated.

14. The clamp of claim 13, wherein the means for causing relative movement of the jaws includes:
q. means for mounting the jaw carrying the latches, for movement towards and away from the other jaw which is in a fixed plane relative to the direction in which the jaw carrying he latches moves.

15. The clamp of claim 14, wherein the abutments and tops have mating contacting surfaces.

* * * * *